United States Patent Office 3,342,864
Patented Sept. 19, 1967

3,342,864
PENTAFLUOROISOPROPYLIDENEIMINE
William J. Middleton, Wilmington, Del., assignor to E. I. du Pont de Nemours and Company, Wilmington, Del., a corporation of Delaware
No Drawing. Filed Dec. 22, 1965, Ser. No. 515,745
1 Claim. (Cl. 260—566)

This invention relates to a new polyfluoroketone imine. The imines of certain polyfluoroperhaloketones have been reported previously. These imines have the general formula $$R^1-CF_2-\overset{\overset{NH}{\|}}{C}-CF_2-R^2$$

where $R^1$ and $R^2$ are fluorine, chlorine or perhaloalkyl, Thus, hexafluoroisopropylideneimine $$CF_3-\overset{\overset{NH}{\|}}{C}-CF_3$$

is described by Zeifman, Gambaryan and Knunyants in Akad. nauk S.S.S.R. Doklady 153, 1334 (1963). Middleton and Krespan in J. Org. Chem. 30, 1398 (1965) describe the same imine and others in which, in the above general formula, $R^1=F$, $R^2=Cl$; $R^1=R^2=Cl$;

$$R^1=R^2=CF_3$$

and their preparation by reaction of the appropriate polyfluoroketone with ammonia, followed by dehydration of the resulting aminohydroxy compound with phosphorus oxychloride in the presence of pyridine. These imines, and others in which hydrogen is present but on a carbon atom at least once removed from the imino group-bearing carbon, are also disclosed in U.S. 3,226,439 filed by W. J. Middleton on January 10, 1963 (issue date Dec. 28, 1965). There are no published reports of polyfluoroimines of this type in which a carbon atom adjacent to the imino group-bearing carbon bears hydrogen. Such imines are not amenable to the preparative method outlined above in view of their instability under basic conditions.

The new product of this invention is pentafluoroisopropylideneimine, $$CF_3-\overset{\overset{NH}{\|}}{C}-CF_2H$$

This product is prepared by an adaptation of the method described by Zeifman et al. (loc. cit.) to prepare hexafluoroisopropylideneimine, with a modification in the last step. Pentafluoroacetone is first reacted with phenyl isocyanate at about 200° C. in the presence of catalytic amounts of a triarylphosphine oxide, such as triphenylphosphine oxide, to form N-phenylpentafluoroisopropylideneimine, which is then treated with ammonia to give N-phenyl-2,2-diaminopentafluoropropane. This product, which need not be isolated or purified prior to the next and last step, is then reacted with phosphorus pentoxide, whereby it splits off aniline with formation of pentafluoroisopropylideneimine. This reaction sequence is represented by the equations:

(1)
$$CF_3-\overset{\overset{O}{\|}}{C}-CF_2H + C_6H_5NCO \xrightarrow{(C_6H_5)_3PO}$$

$$CF_3-\overset{\overset{NC_6H_5}{\|}}{C}-CF_2H + CO_2$$

(2)
$$CF_3-\overset{\overset{NC_6H_5}{\|}}{C}-CF_2H + NH_3 \longrightarrow CF_3-\overset{NHC_6H_5}{\underset{NH_2}{\overset{|}{C}}}-CF_2H$$

(3)
$$CF_3-\overset{NHC_6H_5}{\underset{NH_2}{\overset{|}{C}}}-CF_2H \xrightarrow{P_2O_5} CF_3-\overset{\overset{NH}{\|}}{C}-CF_2H$$

The following example describes the preparation of pentafluoroisopropylideneimine in greater detail.

EXAMPLE 1

Part A.—Preparation of N-phenylpentafluoroisopropylideneimine

A mixture of 71.4 g. (0.6 mole) of phenylisocyanate, 92 g. (0.62 mole) of pentafluoroacetone and 10 g. of triphenylphosphine oxide was heated at 200° C. for 16 hours in a 400-ml. bomb. The bomb was cooled and vented, and the contents were distilled to give 75.6 g. (56% yield) of N-phenylpentafluoroisopropylideneimine as a light yellow oil, B.P. 59.6–60° C. (10 mm.), $n_D^{25}$ 1.4394. The $F^{19}$ n.m.r. spectrum indicated a mixture of two isomers (syn and anti). The major isomer (82%) showed a triplet ($J_{FF}=7$) to doublet ($J_{FH}=1.3$) at 69.3 p.p.m. and a doublet ($J_{FH}=52$) to quartet ($J_{FF}=7$) centered at 120.4 p.p.m. The minor isomer (18%) showed a triplet ($J_{FF}=7$) to doublet ($J=1.3$) at 62.1 p.p.m. and a doublet ($J_{FH}=52$) to a quartet ($J=1.3$) at 125.4 p.p.m. The $H^1$ n.m.r. spectrum of the major isomer showed a multiplet (5H) centered at $\tau 3.00$ and a triplet ($J=52$) to a quartet ($J=1.3$) centered at $\tau 3.96$ (1H); and the minor isomer showed a multiplet at $\tau 7.0$ (5H) and a triplet ($J=52$) centered at $\tau 3.84$ (1H). The ultraviolet spectrum showed $$\lambda_{max.}^{C_6H_{12}} 327\ m\mu$$

($\epsilon=15,500$). The infrared spectrum had an absorption at $5.88\mu$ for C=N.

Analysis.—Calcd. for $C_9H_6F_5N$: C, 48.44; H, 2.71; F, 42.57; N, 6.28.
Found: C, 48.77; H, 2.92; F, 42.51; N, 6.27.

Part B.—Preparation of pentafluoroisopropylideneimine

Ammonia, 21 ml. at −78° C. (ca. 1 mole) was slowly distilled into 74.3 g. (0.33 mole) of N-phenylpentafluoroisopropylideneimine contained in a flask cooled by an ice bath and connected to a Dry Ice-cooled condenser. The reaction mixture was allowed to reflux for 2 hours, and then stirred at room temperature overnight. The entire reaction mixture, ca. 60 ml., was mixed with 200 g. of phosphorus pentoxide contained in a flask connected to a simple still. The flask was heated strongly to distill out the volatile products. The distillate was redistilled to give 26.1 g. (52% yield) of pentafluoroisopropylideneimine as a colorless liquid, B.P. 42.5° C., $n_D^{25}$ <1.3. This imine was also prepared in 38% yield by a pyrolytic distillation at atmospheric pressure of N-phenylpentafluoroisopropylideneimine.

The $F^{19}$ n.m.r. spectrum indicated the presence of two isomers (syn and anti). The major isomer (58%) showed a triplet ($J=4.5$) to a doublet ($J=2.4$) centered at 71.8 p.p.m. (3F) and a doublet ($J=54$ c.p.s.) to quartets ($J=4.5$ c.p.s.) to doublets ($J=4.5$) centered at 127.0 p.p.m. (2F); the minor isomer (42%) showed a triplet ($J=6$) to triplet ($J=1$) at 72.6 p.p.m. and a doublet ($J=53$) to quartets ($J=6$) to doublets ($J=3.4$) centered at 123.4 p.p.m. The $H^1$ n.m.r. spectrum of the mixture of isomers showed a broad absorption at $\tau$−1.66 for NH, with the CH of the major isomer as a triplet ($J=54$) to a doublet ($J=0.5$) centered at $\tau 3.80$ and the CH of the minor isomer as a triplet ($J=53$) to quartets ($J=1.0$) to doublets ($J=1.0$) centered at $\tau 3.69$. The infrared spectrum of the isometric mixture indicated a C=N at 5.87μ, NH at 3.03μ, and CH at 3.32μ.

*Analysis.*—Calcd. for $C_3H_2F_5N$: C, 24.49; H, 1.37; F, 64.60; N, 9.53.
Found: C, 24.80; H, 1.52; F, 64.78; N, 9.42.

Because pentafluoroisopropylideneimine contains a hydrogen atom alpha to the imino group, it is susceptible to reactions which the fully halogenated ketimines, such as those disclosed in the references mentioned above, are not capable of undergoing. One such reaction is the self condensation of pentafluoroisopropylideneimine by the action of sodium hydride to form low and higher-molecular weight condensation products of polymers. The liquid condensation products are useful as heat exchange fluids and high temperature hydraulic fluids, since they are stable in contact with metal surfaces, such as copper, nickel, and steel, even at elevated temperatures. The solid condensation products are useful as adhesives, and can be used to join metal plates together. This useful property of pentafluoroisopropylideneimine is illustrated in Examples A, B, and C below.

EXAMPLE A

A solution of 14.7 g. (0.1 mole) of pentafluoroisopropylideneimine in 10 ml. of 1,2-dimethoxyethane was added dropwise over a period of 30 minutes to a stirred suspension of 4.8 g. of 50% sodium hydride-50% mineral oil mixture (0.1 mole of NaH) in 40 ml. of 1,2-dimethoxyethane cooled to 0° C. The mixture was warmed to 25° C. and stirred for 2 hours. One hundred ml. of a 10% solution of hydrochloric acid was added, and the organic layer (lower layer) was separated, washed with water, dried over silica gel, and distilled at reduced pressure. A colorless oil, 3.1 g., B.P. 45–50° C. (3.5 mm.), and 3.7 g. of a polymeric residue were obtained. The $H^1$ n.m.r. spectrum of the oil showed loss of —$CF_2H$ groups in the reaction since only 25% of the absorption due to H had triplet character (τ3.6, J=ca. 53 c.p.s.). The $F^{19}$ n.m.r. spectrum of the oil had absorptions due to $CF_3$'s from 65–82 p.p.m. and absorption due to $CF_2$'s from 117 to 130 p.p.m. from chlorotrifluoromethane.

In contrast, when hexafluoroisopropylideneimine was treated with sodium hydride under identically the same conditions, no water-insoluble polymeric products were formed.

EXAMPLE B

A sample of the liquid condensation product from pentafluoroisopropylideneimine was heated in a glass tube containing a copper wire and a steel wire. The tube was heated at 250° F. for 24 hours. Neither the metal wires or the liquid were changed in appearance by this treatment.

EXAMPLE C

A 0.1 g. sample of the solid polymeric condensation product from pentafluoroisopropylideneimine was placed between two plates of aluminum, and the plates were heated to 100° C. and pressed together at 10,000 lbs. ram pressure. After cooling, the plates were firmly attached to each other.

I claim:
Pentafluoroisopropylideneimine.

References Cited

UNITED STATES PATENTS 3,226,439   12/1965   Middleton _____ 260—566

OTHER REFERENCES

Middleton et al., "Journal Organic Chemistry," vol. 30, pp. 1398–1402 (1965).

CHARLES B. PARKER, *Primary Examiner.*

R. HINES, *Assistant Examiner.*